UNITED STATES PATENT OFFICE.

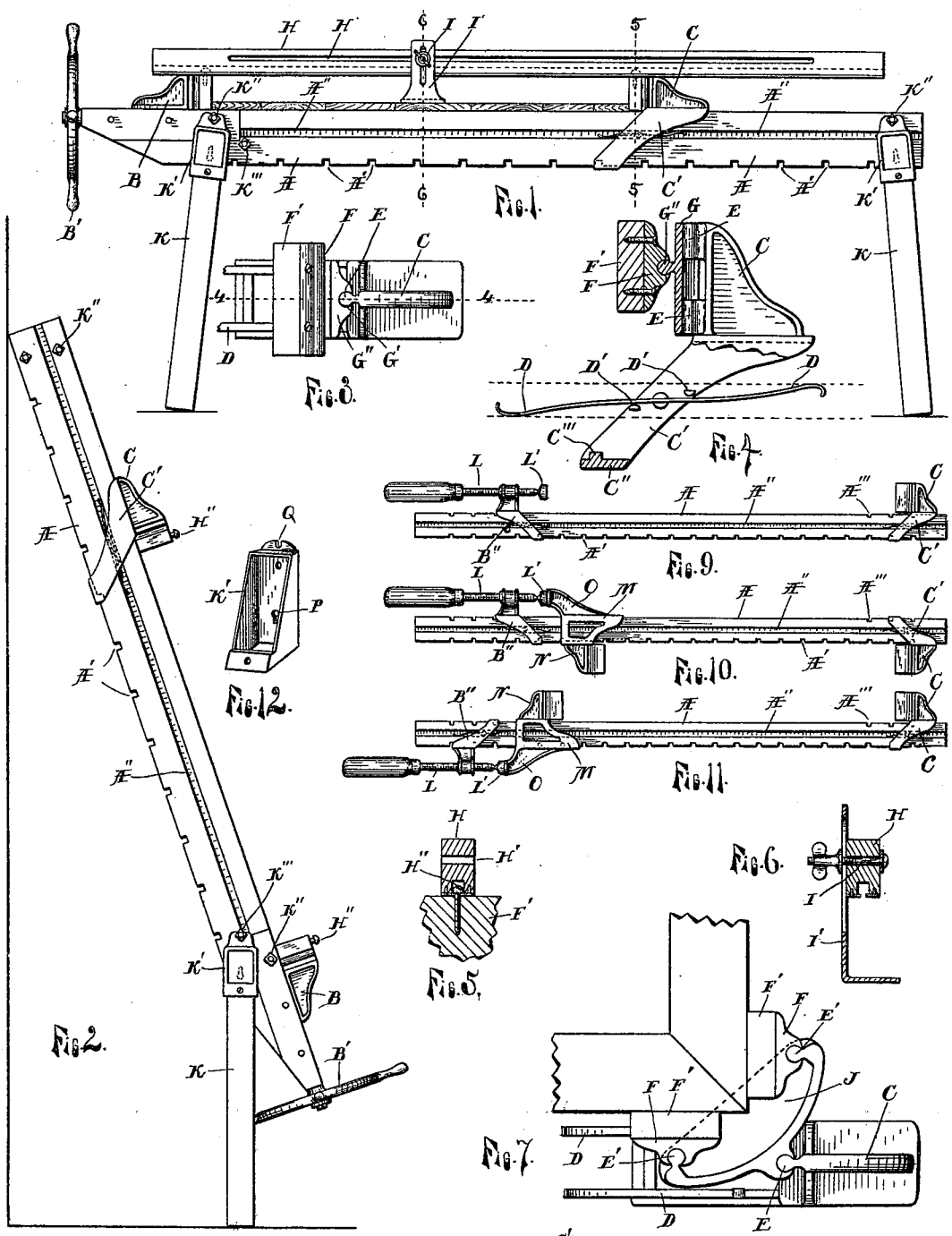

ADOLPH HAMELEHLE, OF GRAND RAPIDS, MICHIGAN.

FURNITURE-CLAMP.

SPECIFICATION forming part of Letters Patent No. 641,694, dated January 23, 1900.

Application filed April 3, 1899. Serial No. 711,495. (No model.)

*To all whom it may concern:*

Be it known that I, ADOLPH HAMELEHLE, a citizen of the United States, residing at Grand Rapids, in the county of Kent and State of Michigan, have invented certain new and useful Improvements in Furniture-Clamps; and I do hereby declare the following to be a full, clear, and exact description of the invention, such as will enable others skilled in the art to which it appertains to make and use the same.

My invention relates to improvements in furniture-clamps; and its object is to provide the same with certain new and useful features hereinafter more fully described, and particularly pointed out in the claims, reference being had to the accompanying drawings, in which—

Figure 1 is a side elevation of a device embodying my invention; Fig. 2, the same arranged in an inclined position; Fig. 3, an enlarged detail of one of the heads; Fig. 4, a vertical section of the same on the line 4 4 of Fig. 3; Fig. 5, a sectional detail on the line 5 5 of Fig. 1; Fig. 6, the same on the line 6 6 of Fig. 1; Fig. 7, a plan view of a corner-clamp attachment; Fig. 8, a detail of the double-joint attachment; Figs. 9, 10, and 11, side elevations of a modified hand-clamp; and Fig. 12, a detail in perspective of the leg-socket.

Like letters refer to like parts in all of the figures.

A represents a beam of wood of suitable dimensions having transverse recesses A' at intervals in its lower side and longitudinal grooves A" in its vertical sides.

B is a movable head mounted on the beam A, near one end, and actuated by a screw operated by a hand-wheel B'. C is an adjustable head also mounted on the beam A and having inclined parallel sides C', embracing the beam, a transverse plate C" connecting the lower ends of the sides C' and provided with a rib C'" to engage the transverse recesses A' and hold the head C from moving. Springs D are attached near the middle to the sides C' and extend oppositely therefrom. The ends of said springs engage the respective upper and lower walls of the grooves A" and act to yieldingly hold the head C down upon the beam and the rib C'" in engagement with a recess A'. Stops D' on the sides C' are so located that they engage the upper and lower walls of the groove A" and limit the angular relation of the sides C' to the beam to prevent bending the springs when releasing the rib C'" from the recesses A' to move the head C. Connected to each head by a suitable neck is a cylindrical portion E with its axis at right angles to the beam A. A swivel-block F is provided with a suitable facing F' at one side to engage the work and concave channel at the other side to engage the portion E, whereby the said block has a limited movement about the axis of the same to adapt it to engage tapered work. To provide this swivel-block with a universal-joint connection with the head, (which is sometimes convenient,) I provide the attachment G, (shown in Figs. 4 and 8,) having the vertical channel G' to engage cylindrical portion E, and also having at its opposite side a transverse cylindrical portion G" to engage the channel in the block F. The device is thus readily adapted to clamp thin flat stuff arranged in contact with the beam A and having either parallel or tapered edges or quickly adapted to clamp any structure having sides inclined in any way, either vertically or horizontally, by turning the block F and inserting the attachment G.

To hold the work down, I provide a bar H, having a horizontal slot H' extending through the same, through which slot passes a bolt I, provided with a thumb-nut, which bolt adjustably secures a vertically-adjustable presser-foot I', consisting of a plate vertically slotted and bent at right angles near the bottom and adapted to engage and hold the work down on the beam A. The bar H is also provided with a T-slot in its under side, which is engaged by T-heads or screws H", projecting from the top of the facings F' and longitudinally movable in the said T-slots.

For clamping angular work close to its angles I provide the device illustrated in Fig. 7, consisting of an angle-block J, provided with a vertical channel to engage the cylindrical portion E of the head C and having at each end a cylindrical portion E' E' and adapted to be positioned in a line at substantially forty-five degrees to that of the bar A, and to these portions E' are attached swivel-blocks F F, with the faces normally substantially at right angles to each other to engage the respective sides of angular work at the respective sides of the angle thereof. Two complete clamps having four of these attachments will effectually clamp the respective angles of a rectangular structure when such clamps are placed with their beams parallel to each other. It will, however, be observed that the block is hinged J to the head and the swivel-blocks F are also hinged to the block J, and all turn freely on vertical axes throughout a considerable arc, whereby they will automatically adapt themselves to the sides of work having acute or obtuse angles as well as to work having right angles, and, further, that the same parts may also be quickly arranged to clamp work at opposite parallel sides by removing the angle-block J and one of the swivel-blocks F and attaching the other swivel-block F directly to the head C.

To adapt the device to use in inclined position and for convenience in shipping, storage, &c., I provide the beam A with detachable legs K, having heads K', each provided with a keyhole-slot P and recess Q, adapted to engage lag-screws K'' to hold the same in place. The legs near the head B are made adjustable, as shown in Fig. 2, by means of supplementary screws K''', whereby they may be adjusted at an acute angle to the beam A when the latter is leaned against a wall or other rest. This adjustment is very convenient for certain kinds of work, notably headboards for bedsteads and the like.

Figs. 9, 10, and 11 illustrate a modified structure for a light hand-clamp. Fig. 9 illustrates one adjustment which may be called "normal," the head B'' being provided with a hand-screw L, having a head L' to directly engage the work and connected to the screw by a ball-and-socket joint. For engaging thin work on the face of an extended flat surface the rear head C is reversed, as in Fig. 10, and an intermediate slide M is provided, surrounding the beam and having at one side a head N opposite the head C and a horn O to engage the head on the screw. By this arrangement the screw is located at the opposite side of the beam from the clamping-heads, and the latter can be applied to thin stuff laid on an extended flat surface, the handle of the screw thus being made readily accessible. This arrangement also enables any one to apply the clamp to any work located near an inner angle of any structure, the screw-head being adjusted on the beam and the other head being left close to the end. It is sometimes desirable, however, to adjust the head C and have the handle of the screw project beyond the beam. For this purpose the head B'' may be reversed, as in Fig. 11, instead of reversing the head C. For reversing these heads transverse channels A''' are provided in the upper side of the beam A.

Having thus fully described my invention, what I claim, and desire to secure by Letters Patent, is—

1. The combination of a beam having longitudinal grooves in its sides and transverse recesses in its bottom, an adjustable head having inclined side plates embracing the beam and a transverse rib connecting said plates and engaging said recesses, and springs attached to the plates and engaging the respective upper and lower walls of the grooves, substantially as described.

2. The combination of a beam having transverse recesses in the bottom and longitudinal grooves in the sides, a head mounted on the beam and having inclined sides embracing the beam and a transverse rib connecting the sides and engaging the recesses, springs in said grooves and attached to the inclined sides, and stops on the sides engaging the walls of the grooves and limiting the angular relation of the side to the beam, substantially as described.

3. In a clamp, the combination of a beam having adjustable clamping-heads and detachable legs, two of said legs being adjustable in two different relations to said beam, whereby the clamp may be used either horizontally or in an inclined position, substantially as described.

4. The combination of a beam having adjustable heads, legs having sockets, each socket being provided with a keyhole-slot and a recess, screws in the beam to engage the slots and recesses and auxiliary screws for two of the legs, whereby they may be attached in a second position relative to the beam, substantially as described.

5. The combination of a beam having longitudinal grooves and transverse recesses, a screw-adjusted head near one end of the beam, a head slidable on said beam having inclined sides embracing the beam, a transverse rib connecting said sides and engaging the recesses, a spring attached to the sides and near their respective ends engaging the respective walls of the grooves, and detachable legs to support said beam, two of said legs being adapted to be attached to the bar in two different positions, substantially as described.

6. The combination of a clamp having adjustable heads, a bar adjustably attached to the heads and having a longitudinal slot, a presser-foot consisting of a plate vertically slotted and bent at right angles near the bottom, and a bolt passing through the slots in the said bar and presser-foot, substantially as described.

7. The combination of a clamp having adjustable heads, a bar having a T-slot in its under side, T-heads on the adjustable heads engaging the T-slot in the bar, and a vertically-adjustable presser-foot attached to the bar, substantially as described.

8. The combination of a clamp having adjustable heads, a bar having a T-slot in its lower side and a longitudinal slot, a presser-foot having a vertical slot, a bolt in the two last-named slots at their intersection, and T-heads in the heads of the clamp and engaging the T-slots in the bar, substantially as described.

9. In a clamp, the combination of a head and clamping-block having counterpart hinge, members separable and connecting the same, that on the head being arranged with its axis vertical, and an attachment having corresponding hinge members at its opposite sides and arranged transversely to each other, substantially as described.

10. In a clamp, the combination of a head, a vertical cylindrical portion connected by a neck to the head, a swivel-block having a vertical groove to engage said cylindrical portion, and an intermediate block having a corresponding groove at one side and a corresponding cylindrical portion at the other side at right angles to said groove, substantially as described.

11. In combination with a clamp having an adjustable head, an angle-block pivotally connected to the said head, and having cylindrical projections at each end arranged at right angles to each other, and swivel-blocks having concave channels to engage said portions, and having their respective faces normally at substantially right angles to each other, said blocks being adapted to turn on said pivots, and fit work having acute, obtuse, or right angles, substantially as described.

12. In a clamp, a head having a cylindrical part, an angle-block having a groove to engage the same and a like cylindrical part at each end, and swivel-blocks having grooves to engage the cylindrical portions of the angle-block and having their faces to contact the work, at substantially right angles to each other or at various other angles, substantially as described.

13. In a clamp, a beam having transverse recesses on both its upper and lower sides, and heads both reversible and adjustable, and a slide having a head at one side and a horn at the other side and a screw adapted to engage the horn, substantially as described.

14. In a clamp, the combination of a beam having transverse recesses on both its upper and lower sides, heads having inclined sides embracing the beam, and transverse ribs connecting the sides and engaging the recesses, a screw in one of said heads and a slide on said beam having a clamping-head at one side to engage the work and a horn at the other side to engage the screw, substantially as described.

In testimony whereof I affix my signature in presence of two witnesses.

ADOLPH HAMELEHLE.

Witnesses:
LUTHER V. MOULTON,
LEWIS E. FLANDERS.